(12) United States Patent
Cuthbertson

(10) Patent No.: US 7,611,382 B2
(45) Date of Patent: Nov. 3, 2009

(54) DIGITAL TELEVISION TUNER WITH DIGITAL TO ANALOG CONVERTER EMBEDDED IN A CONNECTOR

(75) Inventor: Scot Cuthbertson, Port Talbot (GB)

(73) Assignee: Intel Corporation, Santa Clara, CA (US)

( * ) Notice: Subject to any disclaimer, the term of this patent is extended or adjusted under 35 U.S.C. 154(b) by 949 days.

(21) Appl. No.: 10/691,753

(22) Filed: Oct. 22, 2003

(65) Prior Publication Data
US 2004/0130662 A1    Jul. 8, 2004

(30) Foreign Application Priority Data
Oct. 24, 2002   (GB)   ................. 0224705.4

(51) Int. Cl.
  H01R 13/66   (2006.01)
  H04N 7/20   (2006.01)
  H04N 7/16   (2006.01)
  H04N 5/44   (2006.01)
  H04N 5/50   (2006.01)
(52) U.S. Cl. .................. 439/620.01; 439/620.06; 439/620.15; 439/620.22; 725/70; 725/151; 348/725; 348/731; 348/554
(58) Field of Classification Search .......... 725/151, 725/70; 439/620.01, 620.06, 620.15, 620.22; 348/725, 731, 554; 341/144
See application file for complete search history.

(56) References Cited

U.S. PATENT DOCUMENTS

| | | | | |
|---|---|---|---|---|
| 4,758,896 | A | * | 7/1988 | Ito .................. 348/790 |
| D471,870 | S | * | 3/2003 | Lee ................. D13/147 |
| 6,600,521 | B1 | * | 7/2003 | Smith ............... 348/730 |
| 6,707,508 | B1 | * | 3/2004 | Mears et al. ......... 348/731 |
| 6,918,207 | B2 | * | 7/2005 | Dai .................. 47/81 |
| 7,006,150 | B2 | * | 2/2006 | Van Der Wijst et al. ..... 348/554 |
| 2002/0047942 | A1 | | 4/2002 | Vorenkamp et al. |

(Continued)

FOREIGN PATENT DOCUMENTS

DE    3837486 A1    5/1990

(Continued)

OTHER PUBLICATIONS svideo.com, SCART Video/Audio Output Adapter, Apr. 21, 2001, http://webarchive.org/web/20010421014602/http://www.svideo.com/scart2.html.*

(Continued)

Primary Examiner—Hoang-Vu A Nguyen-Ba
(74) Attorney, Agent, or Firm—Blakely, Sokoloff, Taylor & Zafman LLP

(57) ABSTRACT

A digital television converter is provided, for example for performing all of the functions of a set top box for receiving digital terrestrial or satellite television broadcast signals. The converter comprises a SCART connector for mating with a mating connector on a television apparatus, such as a television receiver or a VCR, which is incapable of reception of digital television broadcasts. This connection provides electrical contact with the apparatus and provides mechanical support for the converter. The converter also comprises a tuner which selects and demodulates a television channel for reception and supplies to the connector signals in a form suitable for use by the television apparatus. A connector rear housing completes the enclosure for the converter containing the tuner.

9 Claims, 3 Drawing Sheets

U.S. PATENT DOCUMENTS

2002/0113908 A1    8/2002    Sprowson et al.

FOREIGN PATENT DOCUMENTS

| | | | |
|---|---|---|---|
| EP | 0 893 765 A1 | | 1/1999 |
| EP | 1 045 584 A2 | | 10/2000 |
| EP | 1 059 809 A2 | | 12/2000 |
| EP | 1 156 671 A2 | | 11/2001 |
| EP | 1 176 821 A1 | | 1/2002 |
| JP | 09 288526 A | | 2/1998 |
| KR | 10-2001-0015486 | * | 2/2001 |
| KR | 10-2001-0016381 | * | 3/2001 |
| KR | 10-2001-0068517 | * | 7/2001 |
| KR | 10-2001-0078997 | * | 8/2001 |
| KR | 10-2001-0080818 | * | 12/2001 |
| WO | WO 01/15443 A1 | | 3/2001 |

OTHER PUBLICATIONS

Patents Act 1977: Search Report under Section 17 for United Kingdom Counterpart Application No. GB 0224705.4 (Jan. 9, 2003).
European Search Report, Reference Number: JSR.P52282EP, U.S. Appl. No. EP 03 10 3573.6-2202, Feb. 15, 2006, 3 pages.

* cited by examiner

DIGITAL TELEVISION TUNER WITH DIGITAL TO ANALOG CONVERTER EMBEDDED IN A CONNECTOR

TECHNICAL FIELD

The present invention relates to a digital television converter for a television apparatus which is incapable of reception of digital television broadcasts. A particular application of such a converter is for receiving digital terrestrial or satellite television signals and supplying demodulated signals in a form suitable for a television apparatus, such as a television receiver (including a display screen and audio facilities) or a video cassette recorder (VCR), which does not have the ability to tune and/or demodulate the digital television signals.

DESCRIPTION OF PRIOR ART

Domestic "set top boxes" are presently used for receiving digital terrestrial broadcasts and are provided in an enclosure which is required to fulfill a number of functions. The enclosure is required to house all of the internal components, to provide sufficient cooling of such components, and to comply with electromagnetic compatibility and electrical safety requirements. Generally, a front panel area is required for various displays and controls and a rear panel area is required to provide connections to other equipment and an aerial by means of the appropriate cables.

In a typical set top box (STB), the enclosure contains a main printed circuit board (PCB) onto which most of the electronic components are mounted. An internal power supply is generally provided, although an external power supply unit may be used and it is even possible to use a combination of internal and external power supply arrangements. It is also common for front panel components to be mounted on a front panel PCB connected to the main PCB.

The form factor of such an arrangement is generally determined by the size of the main PCB. Such STBs typically have a form factor of a consumer home entertainment product, such as a domestic sound system, a digital versatile disc (DVD) player or a VCR. The mechanical constraints on an apparatus of this type require that it be self-supporting with cables providing connections, for example, to a television receiver and a VCR. Thus, in a domestic environment, space must be found to accommodate an STB and the type of enclosure or housing makes a substantial contribution to the cost.

SUMMARY

According to the invention, there is provided a digital television converter for a television apparatus which is incapable of reception of digital television broadcasts, the converter comprising a connector for mating with a mating connector on the television apparatus so as to make electrical contact therewith and to be supported thereby, a tuner for selecting and demodulating a digital television channel and for supplying to the connector signals in a form suitable for use by the apparatus, and a connector rear housing which cooperates with the connector to form an enclosure containing and mechanically supporting the tuner.

The connector may be a SCART connector.

The converter may comprise an aerial input connector fixed to the housing and electrically connected to an input of the tuner.

The tuner may be mounted on a printed circuit board which is electrically connected to the connector and which is mechanically connected to the connector so as to be supported thereby. The connector may comprise a plurality of terminals with rear portions connected to the circuit board. The circuit board may extend below the rear portions. The rear portions may extend rearwardly and then downwardly so as to connect to the circuit board. The connector may comprise a body to which the circuit board is mechanically fixed. The converter may comprise a further connector mounted on the enclosure for mating with a further mating cable-end connector. The converter may comprise a changeover switching arrangement for selectively connecting the connector to the tuner or the further connector.

The tuner may include a controller for controlling the converter in response to remote control signals. The converter may comprise a remote control signal input connector mounted on the enclosure.

The converter may comprise a power supply input connector mounted on the enclosure for connection to a remote power supply.

It is thus possible to provide a very compact arrangement which may, for example, be used to perform all of the functions of a conventional set top box in a very compact arrangement requiring minimal space. Advantage can be taken of the scale of integration such that a whole tuner may be accommodated within the body of a connector arrangement, for example, of the SCART type (also known as a Peritel connector). A relatively inexpensive and very compact housing can be used and advantage can be taken of remote control systems for controlling the converter such that no large enclosure is required. An arrangement of this type may be manufactured with substantially reduced cost and can be incorporated, for example, into any existing domestic television system without requiring any substantial space or rearrangement of existing components.

DESCRIPTION OF EMBODIMENTS

Figure 1:
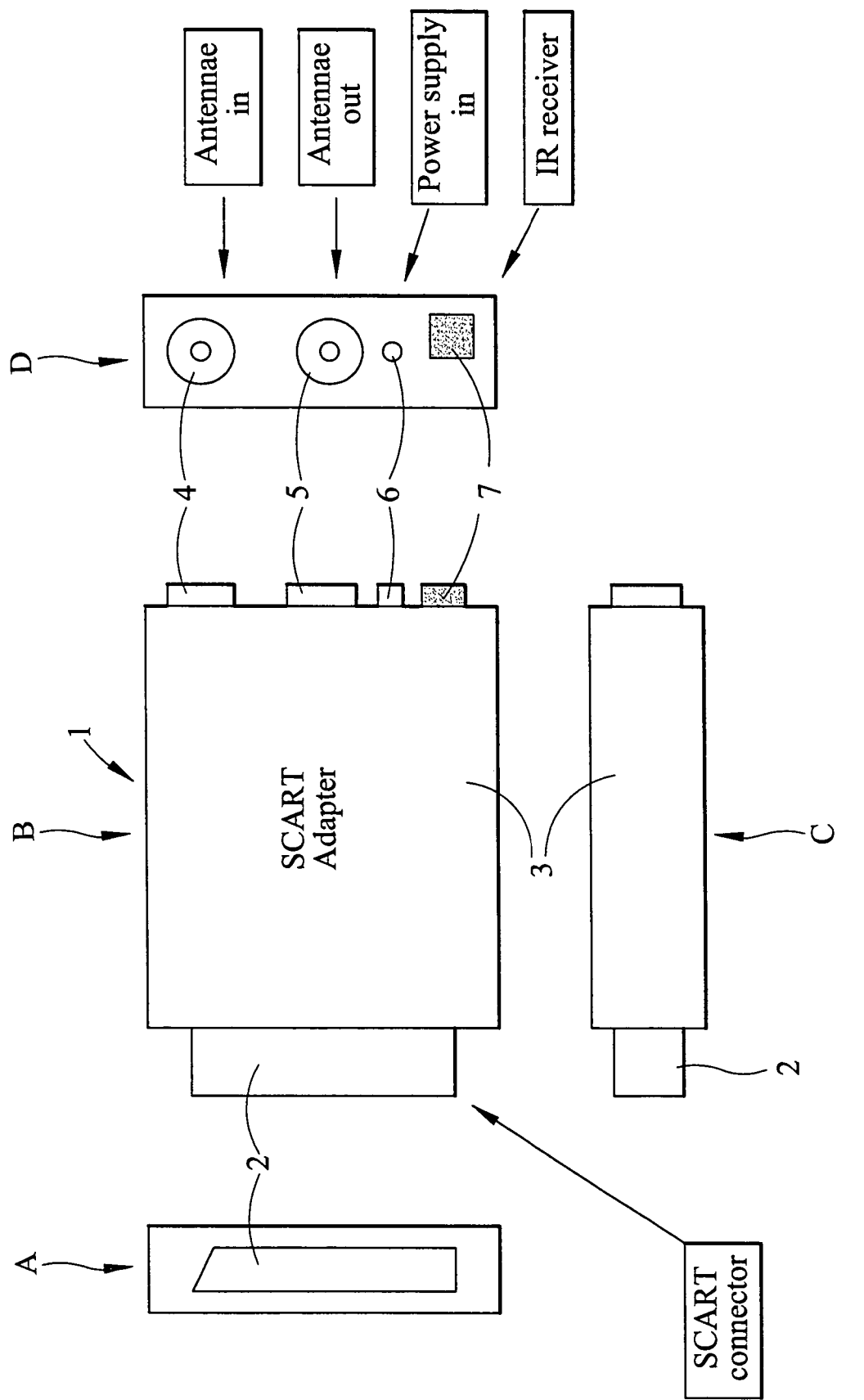
FIG. 1 is a diagram illustrating several views of a converter constituting a first embodiment of the invention.

The converter shown in FIG. 1 is intended for receiving digital terrestrial or satellite broadcast television signals and is embodied in the form of a "SCART adaptor" 1. The converter 1 comprises all of the connectors required for operation of the converter together with all of the components required to select any desired channel from a broadband multi-channel input signal and convert this into signals which are suitable for use by an associated, apparatus such as a television receiver or a VCR.

The converter comprises a SCART connector 2 and a rear housing 3 which cooperates with the connector 2 to form an enclosure on which other connectors are mounted and which contains all of the converter electronics other than an external power supply unit. The connector 2 is in the form of a male connector substantially occupying an end surface of the enclosure and having terminals for transferring decoded audio, video and signalling information to and from a mating connector forming part of a television apparatus, such as a television receiver or VCR. Mating of the connector 2 with the mating connector of the associated apparatus serves not only for providing electrical connections between the converter and the apparatus but also for physically (mechanically) mounting and supporting the converter 1, which therefore does not require any other means of support. The thickness of the housing 3 is comparable with that of the SCART connector 2 so that the converter can be plugged into the mating SCART connector on the television apparatus without fouling any other connections which may be present adjacent the connector on the apparatus.

FIG. 1 comprises a front view A, a side view B, a plan view C and a rear view D of the converter. The rear of the housing accommodates various further connectors required for operation of the converter or for convenience. An antennae input connector in the form of a coaxial socket 4 is provided to allow broadcast television signals to be supplied to the input of the converter. The connector 4 is also connected to an antennae output connector 5 in the form of a coaxial plug to allow the antennae signal to be available for use by other apparatuses. A power supply input connector 6 is provided to permit the use of an external power supply unit and thus reduce the space requirements of the converter 1. However, in alternative arrangements, part or all of the power supply unit may be provided inside the housing 3. An infrared receiver is illustrated at 7 for receiving remote control signals from a remote infrared controller (not shown), which may be of the conventional or known type.

Figure 2:
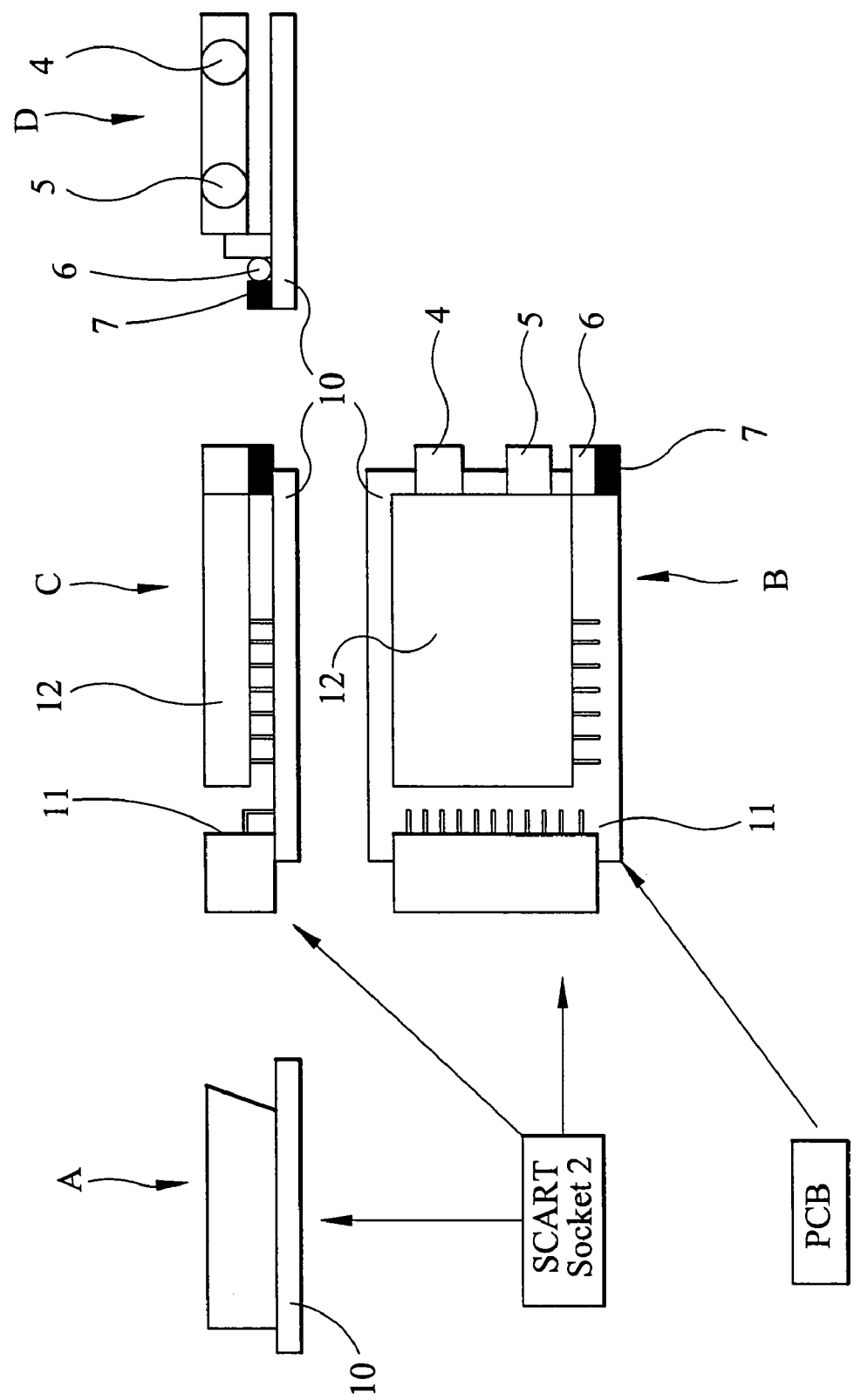
FIG. 2 is a diagram illustrating the internal physical arrangement of a converter constituting another embodiment of the invention.

FIG. 2 illustrates the physical arrangement of a converter of a type similar to that shown in FIG. 1 but with the rear housing removed. The connector 2 is mechanically attached to a printed circuit board (PCB) 10, for example by being bolted thereto. The connector 2 therefore exclusively provides mechanical support for the PCB 10, which in turn supports all of the other components of the converter (except the rear housing). The PCB 10 is electrically connected to the terminals of the connector 2 and extends below the rear portions of these terminals so as to allow the area of the PCB to be utilised as fully as possible while reducing the length of the converter from the connector 2 to the rear of the PCB. The rear portions of the connector terminals, for example as shown at 11, initially extend rearwardly of the connector 2 and are then turned through 90° so as to extend downwardly to the upper surface of the PCB 10, through holes in the PCB 10 to the lower surface, or both for electrical connection to circuit tracks of the PCB.

The PCB 10 supports and provides electrical interconnection for all of the components of the converter. Thus, the PCB 10 supports active devices such as integrated circuits, passive devices such as resistors and capacitors, and modules such as that illustrated at 12 and comprising, for example, the radio frequency, intermediate frequency and demodulator sub-systems of a tuner. The PCB 10 also supports and provides electrical connection to the connectors 4 to 6 and the infrared receiver 7.

Figure 3:
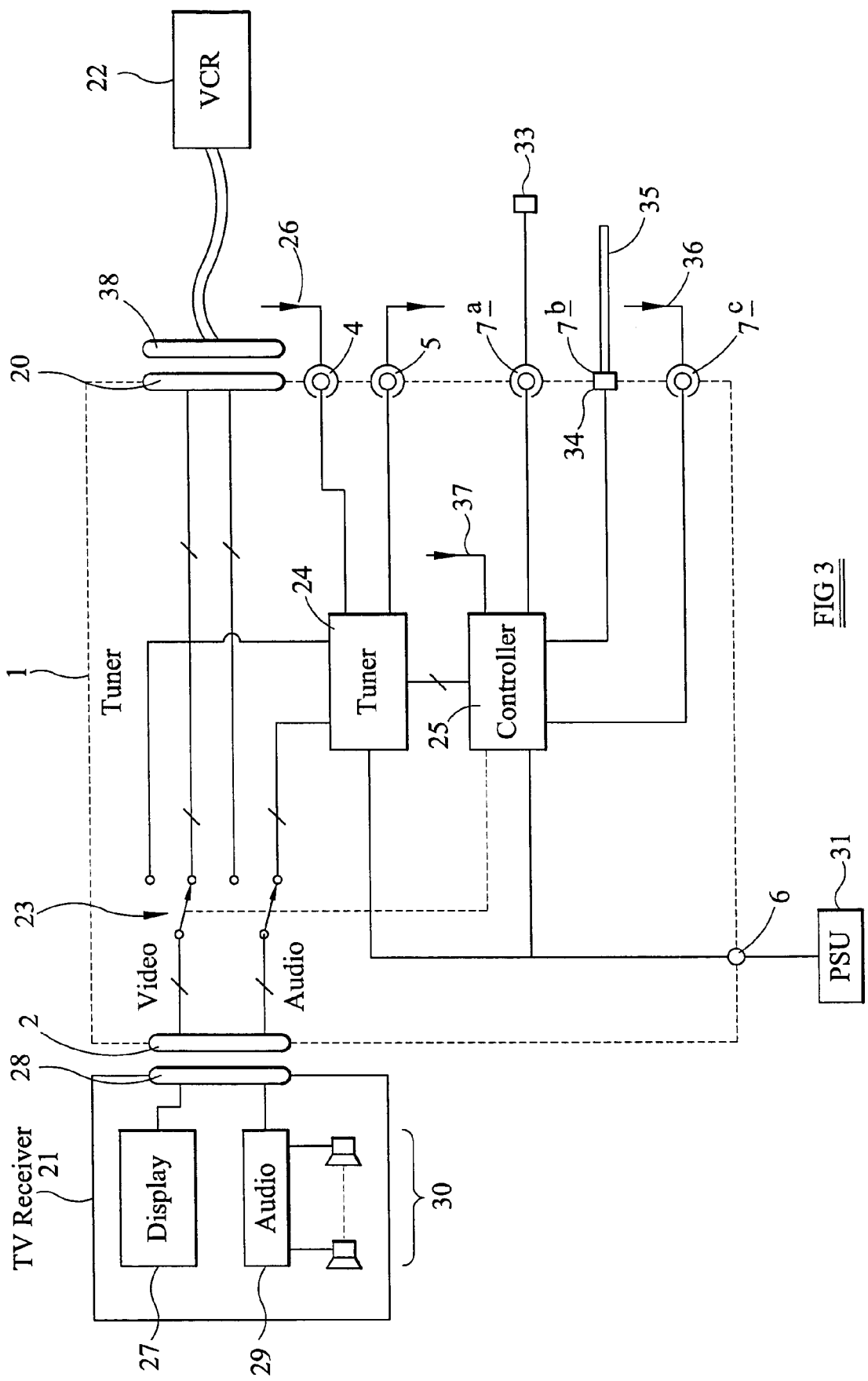
FIG. 3 is a block schematic diagram illustrating the circuit arrangement of a converter constituting an embodiment of the invention.

FIG. 3 illustrates schematically the electrical layout of the converter 1. The converter 1 is shown as having a SCART "loop through" facility to allow a tuner 24 to be disconnected from the connector 2 and the connector 2 to be connected to another SCART connector 20. Thus, when the functions of the converter are not required, such an arrangement allows the SCART port on, for example, a television receiver 21 to be used for another purpose, such as for connection to a VCR 22, without requiring re-plugging. In particular, a switching arrangement 23 is provided to allow the terminals of the connector 2 to be switched either to the tuner 24 of the converter 1 or to the corresponding terminals of the connector 20, in which case the tuner 24 is fully isolated from the through-connection between the connectors 2 and 20. The switching arrangement 23 is of the changeover type and may be operated mechanically by a user or, more conveniently, electrically under remote control or as a consequence of whether the converter 1 is in use or not in use.

The tuner is controlled by a controller 25 in accordance with remote control signals from a suitable remote control handset. The tuner 24 has an aerial input and output connected to the connectors 4 and 5, for example for receiving digital terrestrial or satellite television signals from a terrestrial aerial 26 or from a satellite dish and low noise block (LNB). When activated, the tuner selects a desired television channel for reception and converts this to audio and video signals which are supplied to the connector 2 and which are of a form suitable for use by the television receiver 21. For example, the video signals may be in the form of analogue RGB component signals and/or composite video and the audio signals may be in the form of stereo analogue signals. The television receiver 21 is illustrated as being of the type comprising a display 27 connected to a SCART connector 28 for processing and displaying the video signals from the tuner 1. The receiver 21 also comprises an audio processing circuit 29 for receiving the audio signals from the connector 28 and for supplying these to loudspeakers 30.

The converter 1 is provided with an external power supply unit (PSU) 31 which supplies power to the tuner via the connector 6. FIG. 3 also illustrates various arrangements for permitting the controller 25 to receive the remote control signals for controlling the operation of the converter. For example, if the remote control signals are supplied in the form of infrared signals from the handset, a remote infrared sensor 33 may be disposed in a position suitable for receiving the infrared signals and connected via a suitable lead to an electrical connector 7a, for example of coaxial type. As an alternative, an infrared sensor 34 may comprise or form part of a connector 7b for connection to a light guide 35, whose remote end is arranged to receive the infrared signals.

In the case of radio frequency wireless remote control signals, a connector 7c, such as a coaxial connector, may be provided for connection to a suitable aerial 36. Alternatively, an internal aerial 37 may be provided, in which case there is no need to provide a connector for remote control signals.

In the arrangement shown in FIG. 3, the converter 1 is mounted by mating the SCART connector 2 to the corresponding SCART connector 28 on the receiver 21. This connection provides all of the electrical connections between the converter 1 and the receiver 21 and the mechanical mounting of and support for the converter 1. A VCR 22 is connected via a cable-end SCART connector 38 to the SCART connector 20. Other connections are provided as necessary, for example including connection of the PSU 31, the aerial 26, and any sensing arrangement for the remote control signals. The converter 1 may therefore be incorporated into a home entertainment system without requiring any support while occupying minimal space.

What is claimed is:

1. A digital television converter for a television apparatus, said television apparatus which is incapable of reception of digital television broadcasts, said converter comprising:

a SCART connector for mating with a corresponding connector on said television apparatus so as to make electrical contact therewith and be mechanically supported thereby;

a tuner for selecting and demodulating a digital television channel and for supplying to said connector signals in a form suitable for use by said television apparatus;

a connector rear housing which cooperates with said connector to form a compact enclosure containing and mechanically supporting said tuner wherein a height of said housing is approximately less than twice that of the SCART connector in order to provide a relatively compact converter;

a remote control signal input receiver mounted on said enclosure, wherein the tuner includes a controller to control said converter in response to remote control signals; and a power supply input connector mounted on said enclosure for connection to a remote power supply.

2. A converter as claimed in claim 1 in which said tuner has an input, said connector comprising an aerial input connector fixed to said housing and electrically connected to said input of said tuner.

3. A converter as claimed in claim 1, comprising a printed circuit board, said tuner being mounted on said printed circuit board which is electrically connected to said connector and which is mechanically connected to said connector so as to be supported thereby.

4. A converter as claimed in claim 3, in which said connector comprises a plurality of terminals with rear portions connected to said circuit board.

5. A converter as claimed in claim 4, in which said circuit board extends below said rear portions.

6. A converter as claimed in claim 4, in which said rear portions extend rearwardly and then downwardly so as to connect to said circuit board.

7. A converter as claimed in claim 3, in which said connector comprises a body to which said circuit board is mechanically fixed.

8. A converter as claimed in claim 1, comprising a further connector mounted on said enclosure for mating with a further mating cable-end connector.

9. A converter as claimed in claim 8, comprising a changeover switching arrangement for selectively connecting said connector to one of said tuner and said further connector.

* * * * *

UNITED STATES PATENT AND TRADEMARK OFFICE
CERTIFICATE OF CORRECTION

PATENT NO. : 7,611,382 B2
APPLICATION NO. : 10/691753
DATED : November 3, 2009
INVENTOR(S) : Scot Cuthbertson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1182 days.

Signed and Sealed this

Twelfth Day of October, 2010

David J. Kappos
*Director of the United States Patent and Trademark Office*